United States Patent [19]

English et al.

[11] 4,037,266

[45] July 19, 1977

[54] VOLTAGE SURGE PROTECTOR

[75] Inventors: John Hershel English, North Plainfield; James Edward Griffiths, Murray Hill, both of N.J.; Paul Zuk, Allentown, Pa.

[73] Assignee: Bell Telephone Laboratories, Incorporated, Murray Hill, N.J.

[21] Appl. No.: 645,073

[22] Filed: Dec. 29, 1975

[51] Int. Cl.$^2$ .............. H02H 3/22

[52] U.S. Cl. .............. 361/120; 361/117; 313/217; 313/231.1

[58] Field of Search .............. 317/61, 61.5, 62, 67; 313/217, 218, 214, 216, 231.1, 178, 309, 325, 351; 315/36

[56] References Cited

U.S. PATENT DOCUMENTS

| | | | |
|---|---|---|---|
| 2,177,690 | 10/1939 | Davies | 313/214 X |
| 2,299,184 | 10/1942 | Slepian et al. | 313/325 X |
| 2,749,467 | 6/1956 | Rigden | 313/217 X |
| 2,922,915 | 1/1960 | Greuter | 313/325 |
| 2,923,849 | 2/1960 | Rees | 313/325 X |
| 3,042,828 | 7/1962 | Josephson | 313/214 |
| 3,119,040 | 1/1964 | Gardiner et al. | 313/218 X |
| 3,366,825 | 1/1968 | Lafferty | 313/325 X |
| 3,454,811 | 7/1969 | Scudner | 317/62 X |
| 3,480,821 | 11/1969 | Rich | 313/217 |
| 3,594,603 | 7/1971 | Guckenburg | 313/325 X |
| 3,703,665 | 11/1972 | Yereance et al. | 317/61 |
| 3,811,064 | 5/1974 | Kawiecki | 315/36 X |
| 3,898,533 | 8/1975 | Scudner, Jr. | 317/62 X |

*Primary Examiner*—J D Miller
*Assistant Examiner*—Patrick R. Salce
*Attorney, Agent, or Firm*—Allen N. Friedman

[57] ABSTRACT

Electrical equipment, such as telephone station apparatus, exposed to occasional, destructively high, voltage surges (e.g., lightning strikes) is protected by a device, placed in parallel with the equipment, including two electrodes defining a fixed narrow spark gap which breaks down (arcs over) to short the voltage surge to ground. The predominant failure mode of such devices is shorting across the narrow gap, due to electrode damage produced during the protective arcing mode. In the disclosed devices, the electrodes are contoured to define a narrow region, determining the protective breakdown voltage, and a wider region, sustaining the major part of the electrode damage. Shortly after the initiation of the protective discharge in the narrow gap region, the discharge moves into the wider gap region. Since the major portion of electrode damage is sustained by the wider gap region of the electrodes, the incidence of shorting failure is suppressed. An exemplary electrode profile includes a flat central region and a surrounding tapered region.

2 Claims, 5 Drawing Figures

VOLTAGE SURGE PROTECTOR

BACKGROUND OF THE INVENTION

1. Field of the Invention

The invention is in the field of voltage surge protection devices, such as are used to protect telephone station apparatus from external voltage surges (e.g., lightning strikes and induction or accidental contact between telephone lines and power lines).

2. Description of the Prior Art

In transmission systems with large stretches of outdoor wiring, it is common to protect terminal equipment from voltage surges (e.g., lightning strikes) by the inclusion of a protective device between the line and ground at each terminal. Such devices should be capable of sustaining repeated voltage surges without failing but when they fail, they should fail to an electrically short circuit condition in order to safeguard the terminal equipment. A widely used class of surge protective devices includes two carbon block electrodes with parallel faces defining an air gap of the order of 50 micrometers. This is an extremely inexpensive device, however, the labor cost of replacing failed devices in the field is high. Thus, efforts have been made to extend the service life of such devices.

One such modification, sometimes known as the "gas tube" protector, consists of metal electrodes hermetically sealed in an inert gas atmosphere. Such devices typically include a carbon coating on the electrodes which tends, among other things, to increase the electron emissivity of the surface, thus facilitating the formation of the plasma discharge. One form of such a device utilizes a relatively wide gap (e.g., 500 micrometers) between parallel faces and reduced gas pressure, in order to maintain approximately the same breakdown voltage as the air gap device (U.S. Pat. No. 3,454,811, issued July 8, 1969). This wider gap spacing increases service life, since the chance of shorting failure cross the wider gap is greatly reduced. However, when the hermetic seal on such a device fails, the breakdown voltage increases to far above the safe limit. This is known as a "fail open" condition and represents a finite hazard to the terminal equipment and the user. In another group of such devices the inert gas pressure is maintained at approximately atmospheric pressure. However, this requires the use of a narrow gap (e.g., 25–75 micrometers) for a breakdown voltage within the desired safe range. This device represents an improvement over the narrow gap carbon block device because of the materials used and the inert atmosphere. It also maintains the fail-safe feature of the carbon block device, in that seal failure does not increase breakdown voltage above the acceptable level. Hence the dominant failure mode of this device is still shorting across the gap due to electrode damage.

SUMMARY OF THE INVENTION

A surge protective device has been developed which combines the fail-safe advantage of narrow gap devices and the longer service life of wider gap devices. In these inventive devices at least one of the electrodes is contoured so as to provide a central narrow gap region which determines the arcing potential (breakdown voltage) and a contiguous wider gap region which sustains a large part of the arcing damage. When an abnormal voltage surge appears across such a device, the protective gas discharge forms across the narrow gap region, however, shortly after this breakdown is initiated the arc moves to the wider gap region. The central region is large enough in area so that whatever damage occurs there, will cause shorting failure before electrode widens the gap to produce an unacceptable high breakdown voltage. The electrode contour is such that surrounding this central narrow gap region, the gap gradually widens to form the region of major electrode damage.

If metal electrodes are used it is known that carbon coatings are advantageous. As an optional feature of the devices of the invention, a pattern of carbon filled grooves can be included in the metal electrode surface. This serves to extend the effective life of the carbon coating.

DETAILED DESCRIPTION

Much communication terminal equipment (e.g., telephones and telephone switching apparatus) is protected from extraordinary voltage surges by means of protective devices known as "surge protectors" or "lightning arrestors." The essential function of such devices is provided by two electrodes whose facing broad faces define a predetermined narrow gap. This device, connected between the incoming transmission line and ground, presents an open circuit at the normal operating voltages present in the communications system. During extraordinary voltage surges, caused perhaps by lightning strikes or accidentally power line contact, a gas discharge forms in the gap and provides a short circuit path to ground for the damaging voltage surge energy. A gap spacing of 25 to 75 micrometers results in a breakdown voltage of the order of 750 volts in air at atmospheric pressure. In normal operation, this device returns to its open circuit condition after the passing of the voltage surge and it must be capable of sustaining repeated voltage surges without failure. When it does fail, the dominant failure mode is shorting across the gap due to electrode damage, such as cratering and the formation of particulate debris. When the device remains short circuited after the passing of the voltage surge, the terminal equipment continues to see a short circuit and does not operate. This requires replacement of the defective device. While the devices, themselves, are inexpensive, the total cost of failure, including "down time" and labor charges, is relatively high.

Figure 1:
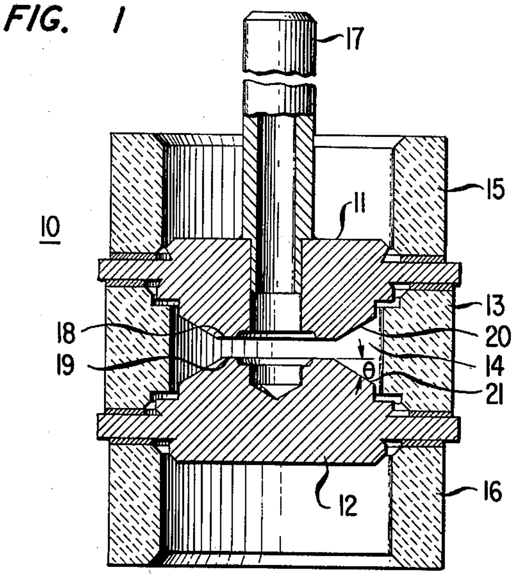
FIG. 1 is an elevational view in section of an exemplary surge protector with contoured electrodes.

An exemplary form of the improved device of the invention is illustrated in FIG. 1. The two electrodes 11, 12 are held in a fixed spaced relationship by a housing 13 to define a gap 14, within which the protective discharge takes place. The illustrated device 10 is of the hermetically sealed type and, as such, includes a tube 17 for evacuation of the air and backfilling with an inert gas. After backfilling, the tube is sealed. Each of the electrodes 11, 12 includes a flat central region 18, 19 and a surrounding tapered region 20, 21. The flat central regions 18, 19 define the narrow portion of the gap 14, which determines the maximum voltage which the device 10 will sustain before a gas discharge forms. The tapered outer region 20, 21 of the electrodes defines the gradually increasing wider region of the gap 14. Shortly after the discharge is initiated in the narrow gap region the arc moves into the gradually widening outer region of the gap where a majority of the electrode damage occurs.

A typical voltage surge includes a rapid buildup followed by a relatively slow decay. It is believed that gas discharge phenomena involving, for example, such forces as gas pressure and electromagnetic forces due to the decreasing magnetic field during this relatively long decay period drive the arc from the central narrow gap portion into the wider gap portion during the relatively long decay period.

Electrode damage can be thought of as falling into two general categories: The first is cratering and particle production which tends to narrow the gap and produce short circuiting. The second is electrode erosion which tends to widen the gap. In order to produce a fail-safe device the flat portion 18, 19 of the electrodes must be of sufficient area that the first mechanism dominates the second mechanism. That is, if the central region is too small the erosive character of that portion of the electrode damage which does take place in the narrow gap region will tend to produce a widening of the gap at a faster rate or with higher probability, than the cratering effect will tend to produce short circuiting. Such devices will have an unacceptably high probability of failing open. The value of this minimum area depends upon the average peak surge current which the device is expected to sustain.

Figure 2:
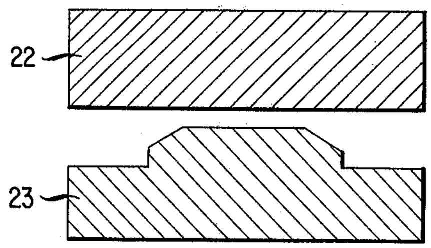
FIG. 2 is an elevational view in section showing portions of a pair of electrodes with a second exemplary contour.
Figure 3:
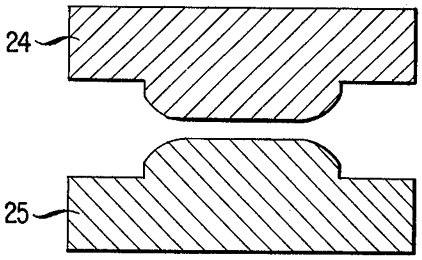
FIG. 3 is an elevational view in section showing portions of a pair of electrodes with a third exemplary contour.

Another design consideration of the device of the invention is that the contour defining the wider region of the gap 14 must be gentle enough to permit the actuating forces to drive the arc outward. An abrupt step or sharply sloped region between the narrow and wide gap regions would be detrimental to the operation of the device, with the arc tending to remain confined to the central region. In the device illustrated in FIG. 1 the tapered outer region 20, 21 of each electrode defines the frustrum of a cone. For best device performance the tangent of the angle between the surfaces 20 and 18 and between 21 and 19 should be between 0.08 and 0.24 (corresponding to an angle of from 5° to 15°). If the angle is smaller than this, there would not be sufficient gap spread at the outer edge of the electrode to materially increase service life. An angle above this range would unduly inhibit the spread of the arc into the wider gap region. As shown in FIG. 2 it is not necessary that both electrodes 22, 23 be contoured and as illustrated in FIG. 3 it is not necessary that the contour of the electrodes 24, 25 at the wider gap region define the frustrum of a cone. Any contour defining a sufficiently gentle slope, yet defining a gap which is at least 50 percent wider at the edge of the electrodes 24, 25 than the width of the narrow gap region would operate within the scope of the invention. For devices with copper electrodes, the narrow gap region should have an area of at least 0.5 square millimeters to produce a sufficiently high probability of fail-safe performance for primary protection against pulses in the range of hundreds of amperes.

Figure 4:
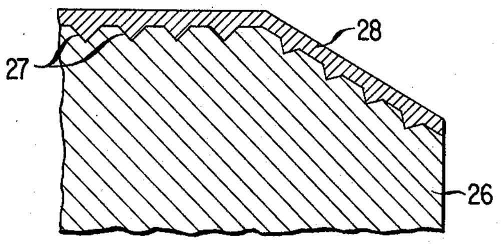
FIG. 4 is an elevational view in section of a portion of a metal electrode showing carbon coating and carbon filled grooves.
Figure 5:
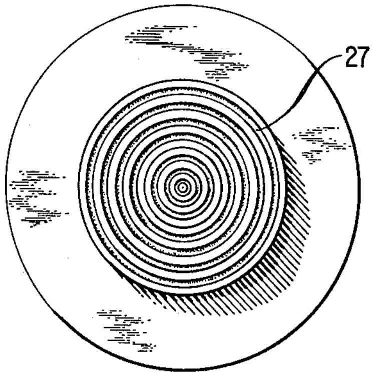
FIG. 5 is a plan view of an exemplary electrode showing a pattern of grooves, prior to the application of the carbon coating.

It is known that the performance of metal electrode surge protectors is improved by the inclusion of a carbon coating on the gap defining surfaces. Repeated breakdown of a surge protector including such carbon coated electrodes produces gradual deterioration of the carbon coating. It has been found that this deterioration can be inhibited by providing the electrodes with a roughened surface or even the provision of a pattern of shallow grooves filled with carbon to at least the level of the surface of the electrode. A portion of such a grooved electrode is shown in section in FIG. 4 which shows the body of the electrode 26, the carbon filled grooves 27 and the overall carbon coating 28. The grooves should be no wider or deeper than one-half half of the gap spacing so as not to unduly affect the motion of the arc. FIG. 5 shows a top view of such an electrode prior to the application of the carbon and illustrates the use of a set of circular grooves 27.

EXAMPLES

A set of 12 surge protectors generally configured as in FIG. 1 with a taper angle tangent of 0.2 (10°) and copper electrodes was fabricated and tested relative to a set of 2000 similarly constructed surge protectors with a uniform gap spacing to the edge of the electrode. The area of the central annular portion with a uniform narrow gap of 50 micrometers was 1 square millimeter. The devices were tested on an instrument which applied repeated voltage pulses sufficient to produce peak current of 300 amperes with a 10 microsecond rise time and a 1 millisecond decay time to ½ peak amplitude. The mean service life of the devices with contoured electrodes was 80 surges. The mean service life of the uniform gap electrode devices was 31 surges.

What is claimed is:

1. An overvoltage surge protector comprising a first electrode and a second electrode and a housing for maintaining the first electrode and the second electrode in spaced relationship to one another and electrically insulated from one another, the said electrodes each possessing a broad face defining a gap therebetween wherein the broad face of at least one of the electrodes is so contoured as to provide a narrow gap portion adapted for initiating the protective discharge and a wider gap portion adapted for receiving and sustaining the protective discharge, whereby an arc is initiated in the narrow gap portion and transfers to the wider gap portion during the protective discharge, wherein at least one of said electrodes, at said broad face, includes a flat inner portion at least 0.5 square millimeters in area, defining a uniformly spaced gap and a tapered outer portion defining an outwardly increasing gap, surround the inner portion and wherein the tapered outer portion defines a frustrum of a cone with a slope of 5° to 15°.

2. A device of claim 1 in which both electrodes possess a tapered outer portion.

* * * * *